2,864,807
POLYAMIDES FROM BRANCHED CHAIN C₈ AND C₁₀ DIAMINES

John F. Nobis and Harry Greenberg, Cincinnati, Ohio, assignors to National Distillers and Chemical Corporation, New York, N. Y., a corporation of Virginia No Drawing. Application June 10, 1955
Serial No. 514,757

1 Claim. (Cl. 260—78)

The present invention relates to new compositions of matter and their preparation and, more particularly, to novel synthetic linear condensation polyamides possessing fiber-forming and other desirable properties.

In general, the novel compositions of matter embodied herein are prepared by reacting a dicarboxylic acid or an amide-forming derivative of a dicarboxylic acid with a particular type of diamine, the reaction being carried out under condensation polymerization conditions until polyamides of relatively high molecular weight are produced and, preferably, until polyamides that are fiber-forming to cold drawable fibers are produced.

In preparation of the novel products embodied herein, the diamine reactant comprises a saturated aliphatic diamine selected from $C_8$ and $C_{10}$ saturated aliphatic diamines characterized by having at least one $C_2$ branch chain and further characterized in that the nitrogen atoms are separated by a chain of at least four carbon atoms. Examples of such diamines include 1,6-diaminooctane, 3,6-diaminooctane, 2,5-diethyl-1,6-diaminohexane, 2-ethyl-1,8-diaminooctane, and others, as well as mixtures thereof. Use of such diamines, believed to be novel for preparation of synthetic linear polyamides, produces as described more fully hereinafter, linear polyamides that are fiber-forming to cold drawable fibers and possess other improved characteristics, including clarity.

For preparation of linear polyamides by reaction of diamines as aforedescribed with a dicarboxylic acid reactant, the dicarboxylic acid reactant may comprise any of a wide variety of such acids, or amide-forming derivatives thereof, including saturated diacids, diacids containing aromatic radicals and/or alicyclic radicals, and the like. In illustration, such diacids include adipic acid, suberic acid, sebacic acid, α-ethylsuberic acid, α,α'-diethyladipic acid, diphenyladipic acid, ditolyladipic acid, dicyclohexyladipic acid, and others. As amide-forming derivatives of dicarboxylic acids, contemplated for use are anhydrides, amides, acid halides, half-esters, and diesters of dicarboxylic acids, with specific examples thereof being diethyl- and dimethyl-esters of dicyclohexyladipic acid, or of diphenyladipic acid, and the like.

As embodied herein, the linear condensation polyamides are characterized by containing units of the following structure:

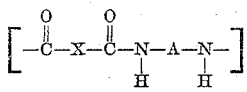

in which X is a hydrocarbon portion of a dicarboxylic acid and A is a hydrocarbon portion of a diamine; and further characterized in that the polyamides comprise units of the aforesaid structure in which A is the hydrocarbon portion of a branched chain $C_8$ or $C_{10}$ diamine as aforedefined.

The polyamides embodied herein may be prepared by heating in substantially equimolecular amounts a suitable diamine as aforedefined and a dicarboxylic acid reactant under condensation polymerization conditions, generally from about 180 to about 300° C., in the presence or absence of a diluent, until relatively high molecular weight linear condensation polyamides are obtained and preferably, to polyamides that possess fiber-forming properties. The preparation of polyamides as embodied herein may be carried out in any of several ways. For example, the diamine and dicarboxylic acid reactant may be intimately mixed in proper proportions and the mixture subjected to condensation polymerization conditions in which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

In order to further describe the invention, but without intent of limitation, the following illustrative embodiments are set forth. In each of the embodiments, the following procedure was employed for preparation of defined salts of the diamine and dicarboxylic acid, and polymerization of the salts to polyamides that were fiber-forming to fibers that could be cold drawn.

PROCEDURE

A pure salt of a diamine and a dicarboxylic acid, as set forth in the tabulation shown hereinafter, was placed in a 15" long Pyrex tube 1¼" in diameter fitted with a capillary for sweeping out the reaction volume with nitrogen free of oxygen and water vapor. The salt in the tube was heated to a melt at atmospheric pressure and water present was removed by sweeping the reaction volume with nitrogen. Vacuum (0.3 mm. mercury) was then applied and the tube was heated to 200° C. for 2–3 hours, and then at 260° C. until the reaction mixture was very viscous and was fiber-forming to cold drawable fibers.

| Dibasic acid | Diamine | Clarity |
| --- | --- | --- |
| Sebacic acid | 1,8-diaminooctane | Opaque. |
| Do | 1,6-diaminooctane | Clear. |
| Do | 3,6-diaminooctane | Do. |
| Do | 2-ethyl-1,8-diaminooctane | Do. |
| Do | 2,5-diethyl-1,6-diaminohexane | Do. |
| Adipic acid | 3,6-diaminooctane | Do. |

As aforesaid, in each of the foregoing embodiments, as well as the polyamide produced from the straight chain amine (1,8-diaminooctane) used for comparative purposes, the polyamides produced were fiber-forming materials, the fibers of which possessed cold-drawable properties. However, and as also shown, the polyamides produced from the $C_8$ and $C_{10}$ branched chain amines as embodied herein were clear materials whereas, in the use of the straight chain $C_8$ amine, with the same diacid, the polyamide was an opaque material. Hence, by use of the branched chain amines as embodied herein, not only can polyamides be produced that are fiber-forming but, additionally, possessed improved clarity characteristics, thereby providing products of enhanced value for many purposes wherein clarity is desired.

With reference to the branched chain diamines employed in the foregoing illustrative embodiments, the diamines were prepared as described hereinafter.

A stirred reactor having a gas inlet tube and a reflux condenser vented to a nitrogen atmosphere was purged with nitrogen and charged with 1,000 parts of dimethyl ether, 3 parts of paraterphenyl and 69 parts of sodium dispersed in 69 parts of isooctane, the average particle size of the sodium being 15 microns. A stream of gaseous butadiene amounting to a total of 168 parts was passed into the reactor over a four hour period while maintaining vigorous agitation and a reaction temperature of −25° C. whereby a reaction mixture was obtained comprising a mixture of isomeric disodio derivatives of $C_8$ butadiene dimers. The reaction mixture containing the disodium derivatives was carbonated by contacting the mixture with an excess of solid carbon dioxide, following which excess $CO_2$, dimethyl ether and isooctane were removed by evaporation, thereby providing a solid product consisting essentially of the sodium salts of $C_{10}$ unsaturated dicarboxylic acid.

The mixture of $C_{10}$ acids was made alkaline with sodium hydroxide to pH 10.5 and hydrogenated with use of a nickel hydrogenation catalyst. The hydrogenated diacids thus obtained were precipitated by addition of mineral acid ($H_2SO_4$), the precipitated diacids being composed of a mixture of sebacic acid, $\alpha,\alpha'$-diethyladipic acid and $\alpha$-ethylsuberic acid. The mixture of acids was esterified with methanol and fractionally distilled, and the resulting diester fractions hydrolyzed, yielding the following three fractions:

(1) $\alpha,\alpha,'$-Diethyladipic acid, M. P. 55°–139° C.
(2) $\alpha$-Ethylsuberic acid, M. P. 76°–77° C.
(3) Sebacic acid, M. P. 133°–134° C.

A.—Preparation of 1,6-diamino octane 360 parts of $\alpha$-ethylsuberic acid [fraction (2)] were placed into a three necked reaction flask fitted with a gas inlet tube, stirrer, and vapor outlet leading to a water cooled condenser. Heat was applied to the flask and dry ammonia gas was introduced when the temperature reached 150° C. The temperature was permitted to rise to 220° C. at which point it was held constant and the gas ($NH_3$) flow maintained for 7 to 15 hours depending on the conversion desired for amide formation. The molten charge from the treatment with ammonia was poured into flat metal pans in which it solidified. The solid was comminuted to about 20 mesh, extracted for several hours with 2% sodium hydroxide solution, filtered, washed with methanol and dried, the dried material being $\alpha$-ethyl suberamide. 177 parts of the $\alpha$-ethyl suberamide were added to a cold aqueous solution (2,000 parts) containing 326.4 parts of bromine and 400 parts sodium hydroxide at 5° C. Reaction proceeded rapidly with the reaction mixture reaching a temperature of 75° C. in 30 minutes. After refluxing for one hour, the clear solution was subjected to continuous extraction with ether for 48 hours. The ether extract was then heated to remove solvent and the product distilled under reduced pressure for the recovery of 1,6-diaminooctane (B. P. 75° C. at 1 mm. Hg).

B.—Preparation of 3,6-diaminooctane 202 parts of $\alpha,\alpha'$-diethyladipic acid (mixture of racemic and meso forms) from fraction (1) were treated with ammonia gas at 200–220° C. for 7 hours as described under (A) hereinbefore. The reaction product was finely ground and treated with aqueous ammonia to remove acidic material. The resulting ammonia-insoluble diamide was washed with distilled water, then with methanol, and air dried. The resulting product was $\alpha,\alpha'$-diethyladipamide (mixture of racemic and meso forms), having a melting range of 235–270° C.

100 parts of the diamide were added to a cold (−2° C.) slurry of 226 parts of sodium hydroxide in 450 parts of water and to which slurry 176 parts of liquid bromine had been added. After 30 minutes, the temperature was permitted to rise to 40° C., spontaneously. The reaction mixture was refluxed for 30 minutes, cooled and filtered. Continuous ether extraction for 16 hours gave, after solvent removal and distillation at 2 mm. Hg, 3,6-diaminooctane (B. P., 60° C.). The pure sebacic acid salt of this amine melted at 159° C. and, on analysis, gave the following values:

|  | Percent | | |
| --- | --- | --- | --- |
|  | C | H | N |
| Found | 62.54 | 10.94 | 8.06 |
| Calculated for $C_8H_{20}N_2C_{12}H_{18}O_4$ | 62.39 | 11.05 | 8.10 |

C.—Preparation of 1,6-diamino-2,5-diethylhexane

A mixture of 70 parts of $\alpha,\alpha'$-diethyladipic acid [fraction (1)] and 20 parts of urea was stirred vigorously for 5½ hours at 160° C. in presence of gaseous ammonia, following which the temperature was increased to 220° C. for 30 minutes. The resulting product was distilled at atmospheric pressure until no more distillate was obtained, the maximum temperature being 325° C. The distillate was taken up in excess diethyl ether and extracted with 3% ammonium hydroxide to remove any unreacted acidic products and by-product cyano acids. The ether solvent was removed, and the resulting dinitrile distilled under reduced pressure. The fraction boiling at 163–164° C./15 mm. was identified at $\alpha,\alpha'$-diethyladiponitrile. The nitrile was then reduced in liquid ammonia over Raney nickel to produce 1,6-diamino-2,5-diethylhexane boiling at 106–110° C./6 mm. For analysis, this diamine was converted to the diisocyanate and gave the following values:

|  | Percent | | |
| --- | --- | --- | --- |
|  | C | H | N |
| Found | 64.52 | 9.03 | 12.23 |
| Calculated for $C_{12}H_{20}N_2O_2$ | 64.27 | 8.98 | 12.48 |

D.—Preparation of 1,8-diamino-2-ethyloctane $\alpha$-Ethylsuberic acid [fraction (2)] was converted to the corresponding nitrile by stirring 40 parts of the acid with 20 parts of urea for 4 hours at 160° C. in presence of gaseous ammonia. At the end of that time, the temperature was increased to 220° C. for ten minutes. The product was distilled at atmospheric pressure until no more distillate was obtained, the maximum temperature being 315° C. The distillate was taken up in excess diethyl ether and extracted with 5% ammonium hydroxide. The ether solvent was removed and the resulting crude dinitrile distilled under reduced pressure. $\alpha$-Ethylsuberonitrile was collected at 184–186° C./15 mm. The nitrile was reduced in liquid ammonia over Raney nickel to yield 1,8-diamino-2-ethyloctane (boiling point, 138–142°C./10 mm. and melding point, 26–27° C.). The diamine was converted to the corresponding diisocyanate which in turn was converted to the dimethyl urethan (M. P. 51.5–53° C.) which gave the following values:

|  | Percent | | |
| --- | --- | --- | --- |
|  | C | H | N |
| Found | 58.30 | 9.78 | 9.71 |
| Calculated for $C_{14}H_{28}O_4N_2$ | 58.40 | 9.77 | 9.80 |

In practice of the invention, the particular branched chain diamines aforedefined, or mixtures thereof, may be used as the sole diamine reactant for polyamide formation with a dicarboxylic acid reactant. However, if desired, the particular diamine or diamines may be used in mixture with other diamines, such as straight chain saturated aliphatic diamines, and, in such usage, the proportional amount of branched-chain diamine as embodied herein should be used in the mixture in amounts that provide the improvements imparted to polyamides by their usage. For example, whereas the straight chain $C_8$ diamine (1,8-diaminooctane) used per se for polyamide formation with sebacic acid, produced an opaque polyamide, the use thereof in mixture with branched chain diamines as embodied herein is not precluded. However, and in further illustration, the amount of the straight chain amine used in mixture with the branched chain should, particularly if clarity is desired, be so controlled that the improvement with respect thereto is not substantially, if at all, impaired.

Although, in the foregoing illustrative embodiments, sebacic acid and adipic acid were employed, thereby illustrating the wide range of dicarboxylic acids useful for practice of the invention, other dibasic acids as aforedescribed may be employed, as well as amide-forming derivatives thereof.

In practice of the invention with respect to embodiments for formation of polyamides that are fiber-forming, the polymerization reaction is carried out until the reaction product has a sufficiently high molecular weight to exhibit fiber-forming properties. The fiber-forming stage is reached when the molten polymer, if touched with a rod, results in a continuous filament of considerable strength and pliability upon drawing the rod away. The fiber-forming polyamides of this invention may be spun into continuous filaments by any of several ways as, for example, in accordance with known methods including attachment of a suitable spinnerette to the bottom of the reaction vessel for direct spinning of the polyamide from the reaction vessel; or by dissolving the polyamide in a suitable solvent and extruding the resulting solution through orifices into a liquid that dissolves solvent but not the polyamides, and collecting the filaments thus formed in a suitable revolving drum or spindle; or by extruding a solution of the polyamide into a heated chamber where the solvent is removed by evaporation; or by extruding the molten polyamide through orifices into the atmosphere where it congeals into a filament.

While there are above disclosed but a limited number of embodiments of the invention herein presented, it is possible to produce still other embodiments without departing from the inventive concept herein disclosed, and it is desired therefore that only such limitations be imposed on the appended claim as are stated therein.

What is claimed is:

A fiber-forming, cold drawable, linear polyamide having as sole complementary polyamide-forming constituents an acid selected from the group consisting of sebacic acid, adipic acid and mixtures thereof and a saturated, aliphatic, branched chain diamine selected from the group consisting of 1,6-diaminooctane, 3,6-diaminooctane, 2-ethyl-1,8-diaminooctane, 2,5-diethyl-1,6-diaminooctane and mixtures thereof.

References Cited in the file of this patent

UNITED STATES PATENTS

| | | |
|---|---|---|
| 2,130,948 | Carothers | Sept. 20, 1938 |
| 2,628,216 | Magat | Feb. 10, 1953 |
| 2,628,218 | Magat | Feb. 10, 1953 |